United States Patent [19]
Stocker et al.

[11] Patent Number: 4,995,264
[45] Date of Patent: Feb. 26, 1991

[54] GAS PRESSURE GAUGE AND PRESSURE MEASURING METHOD

[75] Inventors: Rudolf Stocker, Azmoos; Walter Schaedler, Triesen, both of Switzerland

[73] Assignee: Balzers Aktiengesellschaft, Balzers, Liechtenstein

[21] Appl. No.: 450,856

[22] Filed: Dec. 14, 1989

[30] Foreign Application Priority Data

Jan. 23, 1989 [CH] Switzerland ............. 00206/89

[51] Int. Cl.⁵ ............... G01L 11/00; G01L 21/12
[52] U.S. Cl. ............................. 73/702; 73/755; 310/338; 310/370
[58] Field of Search .......... 73/702, 755, 708, 714; 310/338, 312, 370

[56] References Cited
U.S. PATENT DOCUMENTS 3,064,478 11/1962 Schafer ..................... 73/384
4,507,970 4/1985 Dinger ..................... 73/702
4,747,311 5/1988 Hojoh ..................... 73/702

FOREIGN PATENT DOCUMENTS 0188297 5/1986 European Pat. Off. .
0233054 8/1987 European Pat. Off. .
0347144 12/1989 European Pat. Off. .

OTHER PUBLICATIONS

Design and Testing of a Quarty Friction Vacuum Gauge Using a Self-Oscillating Circuit by M. Hirata et al., 1987, American Vacuum Society, pp. 2393-2396.
Frequency Dependence of a Quartz Oscillator on Gas Pressure by K. Kokubuin et al., Jun. 3, 1985, 1985 American Vacuum Soc.
Unified Formula Describing the Impedance Dependence of a Oscillator on Gas Pressure by K. Kokubun et al., Jan. 5, 1987, 1985 American Vacuum Society.

Primary Examiner—Donald O. Woodiel
Attorney, Agent, or Firm—Frishauf, Holtz, Goodman & Woodward

[57] ABSTRACT

A process for measuring pressure, preferably vacuum is described. The measuring signals from a heat conduction gauge and the measuring signals from a gas friction gauge are processed to a common measuring signal preferably by multiplication. They are linearly superimposed or added. The heat conduction gauge is preferably a Pirani gauge and the gas friction gauge is preferably a tuning fork quartz gauge.

20 Claims, 2 Drawing Sheets

GAS PRESSURE GAUGE AND PRESSURE MEASURING METHOD

Cross reference to related applications, assigned to the assignee of this application:

U.S. application Ser. No. 450,857 filed Dec. 14, 1989 claiming priority Swiss application Ser. No. 00 204/89-0 filed Jan. 23, 1989

U.S. application Ser. No. 452,112 filed Dec. 14, 1989 claiming priority Swiss application Ser. No. 00 205/89-0 filed Jan. 23, 1989.

FIELD OF THE INVENTION

The present invention relates to a process for measuring gas pressures in the low pressure range, as well as to a pressure gauge performing the process, and more particularly to such a method and gauge which provides output signals essentially independent of the nature or type of gas, the pressure of which is being measured.

BACKGROUND

Heat conduction and friction manometers or gauges, as well as ioninization manometers or gauges, are used for measuring the total pressure in a low pressure range. Quartz manometers or gauges, which are a species of gas friction manometers or gauges have also been used.

All indirect measuring processes are dependent on the type of the gas, the pressure of which is to be determined. The gas friction process, like all indirect measuring processes, depends on the type of molecule in the environment of the environment, that is, its influence on the sensor, and changes as the molecule changes. Likewise, measuring processes using the heat conduction measuring process depend on the type of molecule in the environment of the measurement, that is, the influence zone of the sensor, and changes as the molecules change.

THE INVENTION

It is an object to reduce the dependency of output signals on the type of gas, the pressure of which is to be measured, and to provide a measuring instrument with a reduced dependency of the type of the gas being evaluated.

Briefly, a first measuring signal is derived from a heat conduction gas gauge or sensor which is exposed to the gas, the pressure of which is to be determined. This first signal will be inversely proportional to the square root of the molecular mass M of the gas. A second measuring signal is derived from a gas friction sensor or gauge, likewise exposed to the gas to be measured. This second signal is directly proportional to the square root of the molecular mass M of the gas under investigation.

In accordance with a feature of the invention, the first and second signals are then so combined that the inverse dependency on gas molecular mass of the first signal and the direct dependency on gas molecular mass of the second signal effectively cancel each other to obtain an overall output signal, representative essentially only on pressure, and essentially independent of the molecular mass M of the gas, the pressure of which is being measured.

In accordance with a feature of the invention, the combination of the signals is carried out linearly, that is, by addition. In accordance with a preferred feature of the invention, which, however, requires somewhat more complex circuitry, the combination of the signals is effected by multiplication.

The signals can be processed in analog or digital form, and correction parameters, and normalization factors, for example to eliminate zero effects, to provide weighting factors and the like, can be added during signal processing.

DRAWINGS

Figure 1:
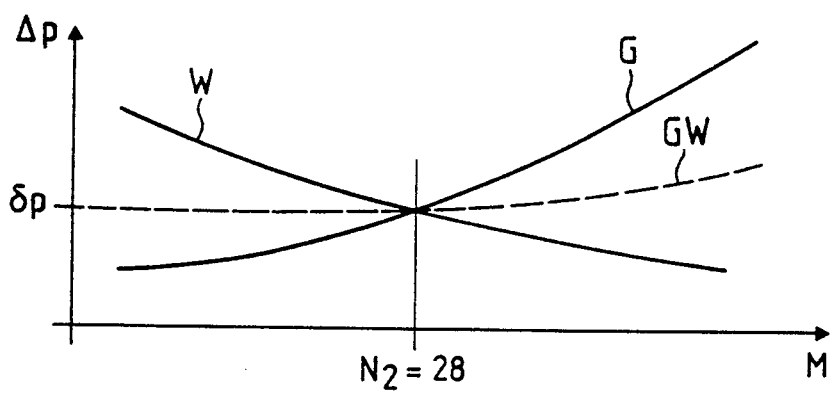
FIG. 1 is a diagram illustrating the pressure dependency with respect to molecular mass of a heat conduction sensor, and a friction-type sensor, respectively.

THEORETICAL DISCUSSION OF PRESSURE METHODS UTILIZING A HEAT CONDUCTION PROCESS AND A GAS FRICTION PROCESS

The operating principles of the two types of sensor used, which although differing from one another, have essential points in common. In the case of an indirectly measuring heat conduction gauge the transfer of thermal energy from individual molecules or atoms from an electrically heated wire, via the heat conduction of the surrounding gas (with its molar thermal capacitance) to a cylinder surround said wire is used for measuring the pressure. In directly measuring gas friction gauges, use is made of the direct action or effect of the gas molecules or atoms on the measuring element.

In the case of the gas friction gauge, e.g. an oscillating quartz manometer or gauge, the oscillation damping increases in proportion to the molecular mass of the particles, which meet the oscillating components, e.g. the legs or tines of a tuning fork. With increasing molecule size, this leads to an erroneous pressure reading, namely a reading which is too high. As a measure for the pressure, a series resistance of an oscillating quartz is measured at resonance, see U.S. Ser. No. 07/452,112, filed Dec. 14, 1989, Stocker. This series resistance is essentially proportional to the root of M, in which M is the molecular mass, see K. Kokubun et al, J. Vac. Sci. Technol., vol. A5, p. 2540 et seq., 1987.

In heat conduction gauges, a specific kinetic energy potential in equilibrium state is used as a reference. Divergences therefrom are interpreted as pressure. It may be assumed that the magnitude of the kinetic energy of the surrounding gas plays a similary important part in heat conduction gauges as in oscillating quartz gauges.

Hot bodies lose their energy mainly due to heat conduction in the gas and to a limited extent by radiation. Variations to this equilibrium caused by pressure ranges are interpreted as pressure changes. As a direct, electrical measuring quantity for the temperature, the electrical, temperature-dependent resistance of a heated wire can be used. The heat conduction from the heat source to the sink is a molecular process, namely the transfer of pulse and energy from the molecules or atoms of hotter bodies to the molecules of colder bodies (statistical thermodynamics).

For example, in the case of Pirani sensor, a heated wire as the heat source is surrounded by a "cold" cylinder as the heat sink. The emitting wire is confronted by an environment which absorbs heat, temporally in a constant manner and some other time, in a variable manner. Molecules positioned spatially in front of the sink, i.e. the cylinder, belong to this "environment" and react to the elastic impacts of the emitted atoms corresponding to their mass with a higher or lower speed increase. The interaction with the environment is slower when heavier molecules are present, absorbing less energy. Thus, considered microscopically, such an environment damps the mechanical process between the material particles.

Observations show that e.g. in the case of the Pirani gauge, upon increasing molecular mass, there is an erroneous pressure reading, i.e. too low. Over a certain pressure range, the power is substantially inversely proportional to the root of M, wherein M is molecular mass, see:

1. S. Dushmann and J.M. Lafferty, Scient. Found. of Vacuum technique, Wiley, 1972.
2. Ch. Edelmann and H.G. Schneider, Vakuumphysik und technik, Akad. Verlagsgesellschaft, 1978.

Each of the above-discussed phenomena leads to an incorrect behavior of the particular sensor. Interestingly, the errors are inversely proportional, as FIG. 1 schematically shows. The piezoelectric resonator shows a gas type dependence, which is substantially proportional to $\sqrt{M}$ and the Pirani sensor a gas type dependence which is inversely proportional to $\sqrt{M}$.

In accordance with a feature of the invention, combining or jointly processing the measured measured results of a friction gauge and a head conduction gauge leads to a certain independence of a pressure measurement of surrounding gases if it is simultaneously performed with sensors of both types and with respect to the particle mass of the surrounding gases.

FIG. 1 shows the pressure variation $\Delta p$ as a function of the molecular or atomic mass M. Graph W shows the characteristics for the heat conduction gauge. Graph G shows the characteristics for a gas friction gauge. Both functions G and W are shown in arbitrary form and are merely intended to indicate the qualitative path or pattern. The characteristic function of a combination G.W of the two functions is indicated by the broken line GW. In equally arbitrary manner, at the the molecular mass $M=28$ is indicated, which corresponds to a pressure variation $\delta p$. This is merely intended to show that the compensation brought about by the combination is relative and not absolute. Thus, the variation $\delta p$ might correspond to a constant, e.g. systematic error, but the function G·W shows that its pressure variation is much less dependent on the molecular mass than either of the two other functions G and W.

This is so in actual fact. On measuring in the same medium simultaneously with a quartz manometer and a Pirani manometer with respect to an absolute pressure normal, first, e.g. in below atmospheric nitrogen and then the $N_2$ molecules are interchanged in a molar identical ratio successively with $H_2$ molecules, then in the case of a "compensatory" signal combination only a slight pressure change is observed. This pressure change is much smaller than that of the two single signals individually which according to known behavior have larger incorrect measurements. Thus, a marked improvement can be obtained with a signal addition or multiplication, respectively.

Possible combination of signals are the linear superimposing or addition of G and W signals, which is the simplest procedure from the circuitry standpoint. Multiplication of G and W signals is somewhat more complicated, and preferred. Further combinations are possible but will not be referred to here. A better independence from type of gas is achieved by using the logarithm of net measured values (i.e. the meaured value minus the measured value at high vacuum), weighting and subsequent addition. Exact compensation is not obtained in case of either combination. The gas type dependence can be further reduced upon increasing the computational effect.

Very precise compensation can be brought about in the case of different gases by experimental measurements and involves the use of refined theories, such as are described in the literature and diligent work. The results of this work can be used in equipment operating in accordance with the process of the present invention. In any case, by combination or linking and processing of the two signals obtained from measuring according to different principles, it is possible to achieve a general improvement to the measuring precision.

DETAILED DESCRIPTION, WITH REFERENCE TO FIG. 2

In accordance with a feature of the invention, a Pirani gauge 12 and a quartz gauge 21 are placed on the same support, at least in such a way that the two sensors are located in a common, not excessively large pressure volume. The analog signals, i.e. the output signal of a Pirani sensor and the output signal of a quartz manometer, are either added, e.g. in an adder such as an operational amplifier (op-amp), or multiplied in a multiplier. The output voltage of the adder or multiplier behaves in proportion to the measured pressure. Known zero effects are removed from the output signal in the Pirani sensor prior to signal combining processing. Instead of proceeding in an analog manner, it is also possible to digitize the signals of the two sensors and combine them mathematically. This makes it possible to introduce further correction factors, parameters, e.g. a-$\delta p$, etc.

In the case of quartz crystall oscillatiors such as tuning fork oscillators, the temperature stabilization is a particular problem. This is discussed in the referenced U.S. patent applications Ser. No. 07/450,857, filed Dec. 14, 1989, Stocker, and Ser. No. 07/452,112, filed Dec. 14, 1989, Stocker, especially the part which deals with temperature compensation. As the Pirani sensor is a heat conduction sensor and has a highly stabilized temperature, it can be simultaneously used for the thermostatic control of the tuning fork oscillator. In this way the system for thermostatic control of the Pirani cell can be concomitantly used. According to a feature of the invention, the tuning fork oscillator is freely suspended in its housing, which is provided with an opening; the housing is provided with a heating element. The heater is chosen in such a way that its resistance has a temperature coefficient not equal to zero, so that it can be used as a Pirani gauge, besides its thermostatic control function. This is the optimum construction. An advantageous fixing of the Pirani piezoelectric sensor element in its preferred form can be gathered from U.S. Pat. application Ser. No. 07/450,857, filed Dec. 14, 1989, Stocker and claiming priority of Swiss Patent Application No. 00 204/89 of Jan. 23, 1989.

Figure 2:
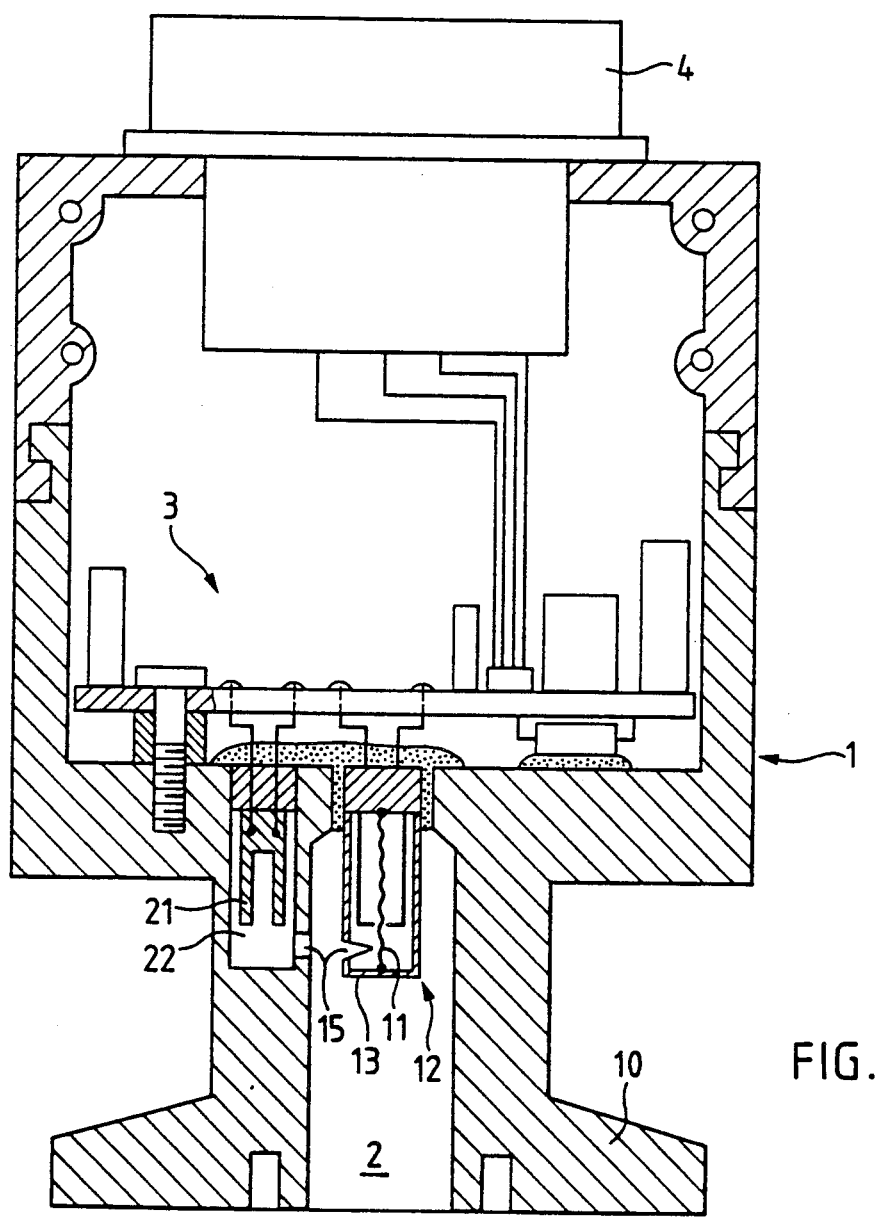
FIG. 2 illustrates the basic construction of a combined, compensating gas pressure gauge.

FIG. 2 is a schematic diagram of an embodiment of a compensatory gas friction/heat conduction manometer and for performing the process, according to the invention. The apparatus comprises a housing 1, which can be connected to a measuring volume, not shown. The housing has a stub with a bore 2 open towards the measuring volume space or volume. The stub of housing 1 terminate in a flange 10. A heat conducting sensor 12, e.g. a Pirani cell with a filament 11 and cylinder 13 is located in the bore 2. The manometer also has a gas friction sensor 21, e.g. a commercially available watch quartz, which is housed in a bore 22 of housing 1. Both sensors 12, 21 are electrically connected to a circuit 3. A lateral opening 15 connects bore 2 with bore 22, which forms a measuring chamber, so that the quartz is pressure connected to the measuring space or volume. The cylinder 13 of the Pirani sensor is also formed with an opening 15 for coupling to the measuring volume. Both the openings 15 are arranged in such a way that they lead into the same pressure space or volume. Any variations with respect to the absolute pressure enter as a $\delta p$ error and have nothing to do with the gas type dependence. The electronic circuit 3 in housing 1 is designed for operating the quartz 21 and the Pirani cell 12, as well as for evaluating the output signals of the two sensors 21. Thus, an apparatus realization of the G.W function according to the diagram in FIG. 1 is obtained. The signals for the combined function can be processed by suitable circuits in analog or digital manner. Processing in digital form can take place by a program in a microprocessor, e.g. integrated into circuit 3. By prior calibration, constants such as $-\delta p$ can be introduced in either the hardware or the software. A combination of hardware and software solutions is obviously also possible. Output signals are available at a terminal connector 4.

The advantage of such a construction is that, by appropriate combination of the output signals of the measuring quartz sensor with those of the Pirani cell sensor, a substantial compensation of the dependence on the type of gas of the individual sensors can be obtained.

Figure 3:
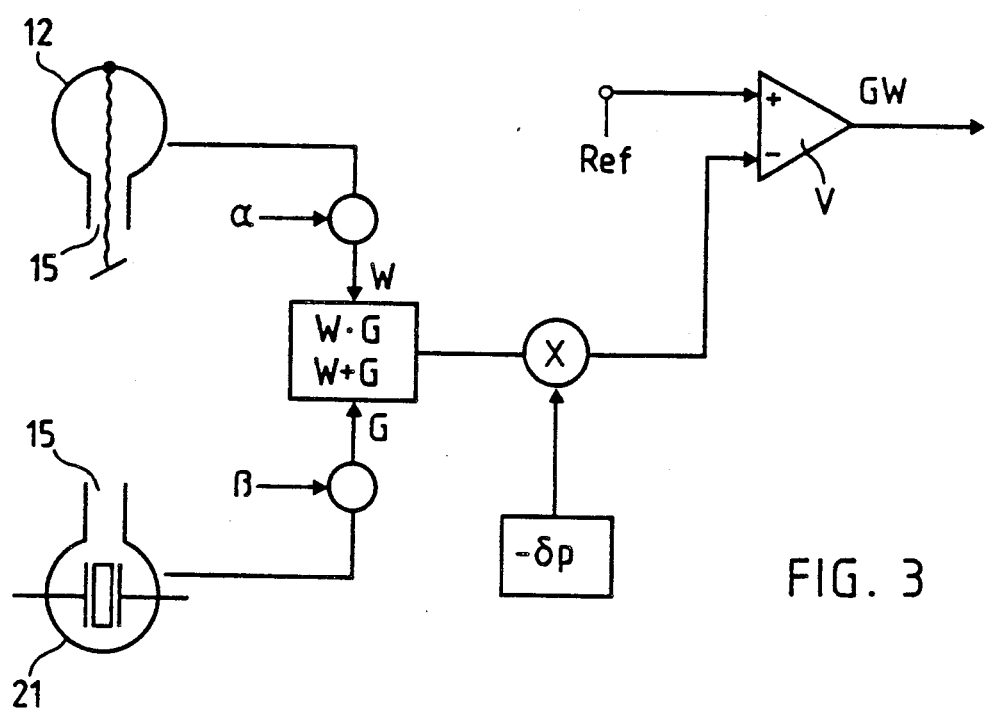
FIG. 3 is a highly schematic abbreviated basic circuit diagram illustrating combination of output signals from the respective sensors utilizing, respectively, heat conduction sensing and friction sensing of pressure, respectively.

FIG. 3 shows a basic circuit for superimposing the output signals of a Pirani cell and a tuning fork quartz. The output signal W of Pirani cell 12 and the output signal G of the tuning fork quartz 21 are joined in a combining circuit, which can be an adding circuit W+G for adding the signals, or in a multiplication circuit W·G for multiplying the signals. The output signal G+W+$\delta p$ or G·W+$\delta p$, respectively, is added in a further adding circuit x to a value $-\delta p$ opposite to the constant error $\delta p$, in order to obtain the accurate measured pressure value GW at the amplifier circuit V. Prior to feeding into the combining circuit, the signals from each sensor are preferably normalized, in that e.g. values $\alpha$ and $\beta$ are associated with the respective signal, in which e.g. $\alpha$ is an added value in order to eliminate zero effects during addition, and $\beta$ is a weighting factor during a multiplication.

It is clear that the aforementioned addition or multiplication can be performed mathematically digitally instead of in analog manner, by digitizing the sensor signals from a heat conduction gauge and a gas friction gauge in general and the Pirani gauge 12 and quartz gauge 21 in the specific case, and can be processed as data in a program. On the basis of the error characteristics of the sensors in the gauges, not all heat conduction sensors can be equally well combined with a quartz gauge, which also applies with regards to the combination of gas friction gauges and Pirano gauges. However, in the case of digital processing of sensor signals it is easier to incorporate corrections, which is not so with analog processing.

We claim:

1. A method for measuring gas pressure, particularly at vacuum pressure levels, wherein said gas to be measured has a molecular mass (M), comprising the steps of deriving a first measuring signal (W) from a heat conduction gauge (11, 12, 13) exposed (15) to the gas, the pressure of which is to be measured, and wherein said first signal will be inversely proportional to $M^{\frac{1}{2}}$;

deriving a second measuring signal (G) from a gas friction gauge (21) exposed (15) to said gas, the pressure of which is to be measured, and wherein said second signal will be directly proportional to $M^{\frac{1}{2}}$; and combining said first and second measuring signals to obtain a pressure output signal, in such a manner that the inverse dependency on gas molecular mass of the gas being measured by said heat conduction gauge, and reflected in said first signal, and the direct dependency on molecular mass of the gas being measured by said gas friction gauge and reflected in said second signal, will essentially, mutually, cancel each other to obtain said pressure output signal which is essentially independent of the molecular mass (M) of the gas, the pressure of which is to be measured.

2. The method of claim 1, wherein said step of combining said first and second measuring signals comprises linearly superimposing said first and second measuring signals to derive said pressure output signal.

3. The method of claim 1, wherein said step of combining said first and second pressure signals comprises adding said first and second measuring signals to obtain said pressure output signal.

4. The method of claim 1, wherein said step of combining said first and second pressure signals comprises multiplying said first and second measuring signals to obtain said pressure output signal.

5. The method of claim 4, including the step of weighting said signals prior to multiplying said signals.

6. The method of claim 1, further including the step of pre-processing at least one of said measuring signals (W, G) prior to carrying out said combining step, said preprocessing step comprising at least one of:

weighting said at least one signal;

removing zero effects from said at least one signal;

converting said at least one signal into logarithmic form.

7. The method of claim 1, further including the step of adding correction value signals to said pressure output signal.

8. The method of claim 7, wherein said correction values are representative of systematic errors and introduce correction values of constant variation.

9. The method of claim 1, wherein said heat conduction gauge comprises a Pirani gauge;

and said gas friction gauge comprises a tuning fork oscillator or tuning fork quartz gauge.

10. The method of claim 9, wherein said Pirani gauge and said tuning fork quartz gauge are in mutually heat-conductive heat transferring relation;

and said Pirani gauge is connected to provide thermostatic temperature control for said quartz crystal gauge (21).

11. A compensated gas pressure measuring gauge, providing a combined pressure output signal which is essentially independent of the molecular mass (M) of the gas, the pressure of which is to be determined, and especially for measuring low pressure values in the vacuum pressure level range, comprising a heat conduction gauge (12, 12, 13) exposed (15) to the gas, the pressure of which is to be measured, and furnishing a first signal which is inversely proportional to $M^{\frac{1}{2}}$;

a gas friction gauge (21) exposed (15) to said gas, the pressure of which is to be measured, and furnishing a second signal which is directly proportional to $M^{\frac{1}{2}}$;

and a combining circuit (3; W·G, W+G) coupled to receive said first measuring signal (W) and said second measuring signal (G) and combining said first and second measuring signals in such a manner that the inverse dependency of said first measuring signal on gas molecular mass, and the direct dependency of said second measuring signal on gas molecular mass effectively cancel each other to form a common output signal, which is essentially independent of the type of the gas, the pressure of which is to be measured, and hence of its molecular mass.

12. The gauge of claim 11, including means (X) coupled to said common pressure output signal for applying correction values thereto.

13. The gauge of claim 11, wherein said heat conduction gauge comprises a Pirani gauge (11, 12, 13); said gas friction gauge comprises a tuning fork quartz gauge; and
common support means (1, 10) locating said Pirani gauge and said tuning fork gauge exposed to a common measuring volume.

14. The gauge of claim 11, wherein said combining circuit comprises an adding circuit.

15. The gauge of claim 11, wherein said combining circuit comprises a multiplying circuit.

16. The gauge of claim 11, further including preprocessing circuit means (α, β) coupled to at least one of said measuring signals furnished by at least one of said gauges, for applying normalizing or weighting factors to the respective signals.

17. The gauge of claim 16, wherein said preprocessing means comprises a conversion means to change the respective signal into logarithmically varying form.

18. The gauge of claim 11, including means to change said measuring signals into digital form;
and wherein said combining circuit is a digital combining circuit.

19. The gauge of claim 11, wherein said heat conduction gauge is a Pirani gauge; said gas friction gauge is a tuning fork quartz gauge;
a common support means (1, 10) is provided for said gauges, and for positioning said gauges close to each other and in thermally coupled relation;
and wherein said Pirani gauge is connected to provide thermostatic temperature control for said tuning fork quartz gauge.

20. The gauge of claim 19, wherein said common support means for said gauges comprises a housing (1) retaining said combining circuit (3), a support wall of said housing having an extending hollow stub portion (2) exposed to said gas, the pressure of which is to be measured, one (12) of said gauges being located in said stub portion exposed to said gas;
wherein said stub portion is formed with a measuring chamber (22) in which the other (21) of said gauges is located;
and gas communication openings (15) between said chamber and the interior of said stub portion, and said one gauge (12) located within said stub portion.

* * * * *